(12) United States Patent
Krings et al.

(10) Patent No.: US 6,901,687 B2
(45) Date of Patent: Jun. 7, 2005

(54) DOMESTIC APPLIANCE AND METHOD OF MANUFACTURING THEREOF

(75) Inventors: Leo Hubert Maria Krings, Singapore (SG); Gerard Cnossen, Singapore (SG); Youg Ling Wu, Singapore (SG); Soo-Kong Chang, Singapore (SG)

(73) Assignees: Koninklijke Philips Electronics N.V., Eindhoven (NL); SimTech, Singapore (SG)

( * ) Notice: Subject to any disclaimer, the term of this patent is extended or adjusted under 35 U.S.C. 154(b) by 315 days.

(21) Appl. No.: 10/258,683

(22) PCT Filed: Feb. 13, 2002

(86) PCT No.: PCT/IB02/00429

§ 371 (c)(1),
(2), (4) Date: Oct. 25, 2002

(87) PCT Pub. No.: WO02/066727

PCT Pub. Date: Aug. 29, 2002

(65) Prior Publication Data

US 2003/0111455 A1 Jun. 19, 2003

(30) Foreign Application Priority Data

Feb. 17, 2001 (SG) .......................................... 200100333
Nov. 7, 2001 (SG) .......................................... 200106863

(51) Int. Cl.$^7$ ............................................. D06F 75/38
(52) U.S. Cl. ........................................................ 38/93
(58) Field of Search .............................. 38/93, 74, 81,
38/77, 78; 219/245, 228, 229; 427/446,
450–456; 428/304.4–315.9; 220/573.1;
126/227

(56) References Cited

U.S. PATENT DOCUMENTS

| 3,271,653 A | * | 9/1966 | Wolf ........................ 220/573.2 |
| 3,480,461 A | * | 11/1969 | Lynge ......................... 38/77.9 |
| 4,531,705 A | * | 7/1985 | Nakagawa et al. ......... 249/134 |
| 4,862,609 A | * | 9/1989 | Ullrich et al. .................. 38/93 |
| 6,784,331 B2 | * | 8/2004 | Harmer et al. .............. 585/406 |

FOREIGN PATENT DOCUMENTS

| DE | 3644211 A1 | 8/1987 | ........... D06F/75/38 |
| EP | 0567822 A1 | 4/1993 | ........... C23C/28/00 |
| GB | 944836 | 12/1963 | |
| WO | WO 98/13544 | * 4/1998 | |

* cited by examiner

Primary Examiner—Ismael Izaguirre

(57) ABSTRACT

Disclosed is a domestic appliance, at least comprising an aluminum sole plate which is provided with a coating which is provided by means of a sol-gel process and wherein an intermediate layer is present between the aluminum sole plate and the sol-gel coating. The intermediate layer comprises a multi-layer structure.

Figure 1:
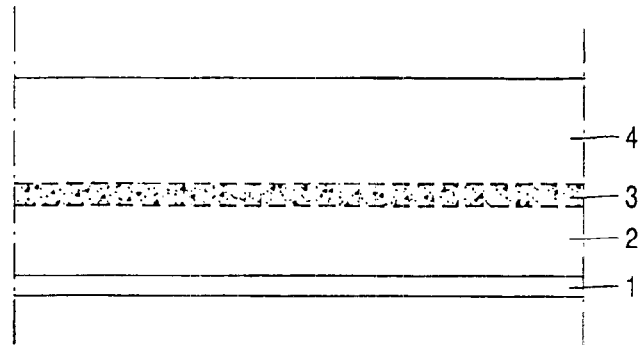

Also described is a method of manufacturing such a domestic appliance. The method comprises the steps of providing an aluminum substrate, applying a porous intermediate layer of aluminum oxide by electrochemical treatment of the aluminum sole plate in an electrolyte comprising a solution of phosphoric acid, applying a dense intermediate layer of aluminum oxide by electrochemical treatment in an electrolyte, and providing a sol-gel coating on the treated substrate.

16 Claims, 1 Drawing Sheet

DOMESTIC APPLIANCE AND METHOD OF MANUFACTURING THEREOF

The present invention relates to a domestic appliance, at least comprising an aluminum substrate that is provided with a coating which is provided by means of a sol-gel process and wherein an intermediate layer is present between the aluminum sole plate and the sol-gel coating. The invention also relates to a method of manufacturing such a domestic appliance.

Domestic appliances which comprise an aluminum substrate that can be heated and that is provided with a sol-gel coating are well known in the art. The advantage of such sol-gel coatings is that these coatings are both heat resistant and relatively scratch resistant. Examples of such appliances are appliances for preparing food and/or beverage, such as coffee makers, toasters, grills or ovens. Another example of such an appliance is in the field of garment care and comprises the (steam) iron.

The International application WO 98/13544 as filed by the applicant discloses an iron having an aluminum sole plate which is provided with an anti-friction layer containing an inorganic polymer and which can be provided by means of a sol-gel process. In order to improve the scratch resistance of the anti-friction layer, a hard intermediate layer is provided in-between said layers. Said hard intermediate layer generally has a thickness ranging between 5 and 60 micrometers.

A disadvantage of the structure according to WO 98/13544 is that, due to high stresses inside the sol-gel layer upon drying and curing, crack-formation in the sol-gel layer is observed. These stresses will cause peeling off of the sol-gel layer as the adhesion to the substrate is not good enough.

It is an object of the invention to provide a domestic appliance according to the preamble, of which the aluminum substrate can be provided with a sol-gel coating, which coating both has an improved scratch resistance and an improved adhesion to the aluminum substrate. Said improved adhesion of the coating to the substrate should be such that even sol-gel coatings of relatively large thickness adhere to an aluminum substrate, without the risk of peeling off of the coating. Moreover, it is an object to provide a method of manufacturing such a domestic appliance.

It is noted that throughout the application the term aluminum refers both to aluminum and alloys of aluminum.

These and other objects of the invention are achieved by an iron according to the preamble, which is characterized in that the intermediate layer comprises a multi-layer structure.

Said multi-layer structure provides for a good adhesion of the sol-gel coating to the aluminum substrate as well as for an increased scratch resistance. Even for relatively thick sol-gel coatings a good adhesion to the aluminum substrate is ensured.

In particular, the intermediate multi-layer structure at least comprises a relatively porous layer and a relatively dense layer. The porous layer is adjacent to the sol-gel layer, while the dense layer is situated between the porous layer and the substrate.

Said porous intermediate layer provides for anchor points for the coating to attach to the surface. The sol-gel coating which is applied over the intermediate layer, penetrates into said pores thereby creating some kind of interpenetrating network. It will be clear that the presence of such porous layer provides for a good mechanical adhesion.

On the other hand, the presence of the dense intermediate layer provides for a hard and dense core layer which ensures good scratch properties of the sol-gel coating.

Preferably, the porous intermediate layer comprises a porous layer of aluminum oxide.

The use of such porous intermediate layer with well defined pore structure provides for a very good adhesion between the sol-gel coating and the aluminum substrate.

Although in principle different hard and dense intermediate layers can the applied, the dense intermediate layer advantageously comprises a dense layer of aluminum oxide.

In order to obtain an optimum adhesion effect of the coating to the sole plate, the porous intermediate layer of aluminum oxide advantageously has a thickness of at least 0,5 $\mu$m.

The thickness of the porous layer of aluminum oxide is first of all important for the adhesion of sol-gel coatings to the aluminum substrate. However, also the scratch resistance of said sol-gel coatings is influenced by the aluminum oxide layer. In order to obtain good adhesion properties only very thin layers of porous aluminum oxide are needed. The thickness of these layers can be in the order of about 0,5–1 $\mu$m. However, in order to improve the scratch resistance the layer should be at least 3–4 $\mu$m, while thicker layers show even better scratch resistances. In view of the time factor to generate the aluminum oxide layer, which becomes more important with thicker layers, the porous oxide layers preferably do not exceed 20 $\mu$m.

In a preferred embodiment, the dense intermediate layer of aluminum oxide has a thickness of at least 5 $\mu$m.

A typical thickness for the dense intermediate layer is 5–50 $\mu$m.

In an advantageous embodiment, the domestic appliance according to the invention comprises an appliance for the preparation of food and/or beverage.

Such appliances are exemplified by, but not limited to, coffee makers, toasters, grills and ovens. Another typical example of such domestic appliance is cookware, such as pots and pans that are provided with a sol-gel coating. As a result of the two layered intermediate structure between the aluminum substrate and the sol-gel coating, a good adhesion of the sol-gel layer as well as good scratch properties of the sol gel coating are ensured.

In a preferred embodiment of the invention, the domestic appliance comprises an iron.

It is noted that the term iron, refers to both non-steam irons and steam irons.

In particular, the sol-gel coating which can be applied to the aluminum sole plate of the iron has a thickness ranging from 5 to 100 $\mu$m.

Advantageously, the sol-gel coating has a thickness of 20–80 $\mu$m, preferably 30–40 $\mu$m.

A single layer of a sol-gel coating can be applied with a thickness of about 10 to 25 $\mu$m. In case a thicker coating is required, the sol-gel coating is advantageously built up of different subsequent layers.

The present invention also relates to a method of manufacturing a domestic appliance as disclosed in the above. Said method is characterized in that it comprises the steps of providing an aluminum substrate, applying a porous intermediate layer of aluminum oxide by electrochemical treatment of the aluminum sole plate in an electrolyte comprising a solution of phosphoric acid, applying a dense intermediate layer of aluminum oxide by electrochemical treatment in an electrolyte, and providing a sol-gel coating on the treated substrate.

Although several electrolytes, known to the skilled person, can be used to apply a dense intermediate layer of aluminum oxide in the electrochemical treatment, advantageously an electrolyte is used that comprises a solution of oxalic acid or sulphuric acid or a mixture thereof.

The combination of the above-mentioned anodised layers leads to very good results. First phosphoric acid anodising is used in order to obtain a porous oxide that ensures a good adhesion of the sol gel coating. Typical thickness for the porous layer is 1–5 $\mu$m. The second step is the application of oxalic acid anodising. Also sulphuric acid or a mixture of oxalic acid and sulphuric acid can be used. In this process step a hard and dense oxide layer is applied in between the aluminium substrate and the phosphoric acid anodised layer. A typical thickness for this layer is about 5–50 $\mu$m. As a result of this new sequential anodising process a two layered structure is obtained having a porous top layer for adhesion and a hard and dense core layer to ensure good scratch properties of the sol gel coating.

It is noted that besides sol-gel, also other coatings can be applied using the above sequential anodising process. An example of such alternative coating is polytetrafluorethylene (PTFE).

The term aluminum comprises aluminum as well as aluminum alloys. Elements which can be included in such aluminum alloys comprise, for example, silicon, magnesium and other suitable elements known to the skilled person.

The sol-gel coating can be applied in different ways, which are known for the person skilled in the art. However, it is preferred to spray the sol-gel coating on the treated aluminum substrate.

The present invention also relates to an aluminum sole plate provided with a coating which is provided by means of a sol-gel process and wherein an intermediate layer is present between the aluminum sole plate and the sol-gel coating, which is suitable for use in an iron. In accordance with the invention the intermediate layer comprises a multi-layer structure. It is observed that the invention can both be applied in conventional irons and in steam irons.

The present invention will further be elucidated with reference to the following example and embodiment.

Figure 2:
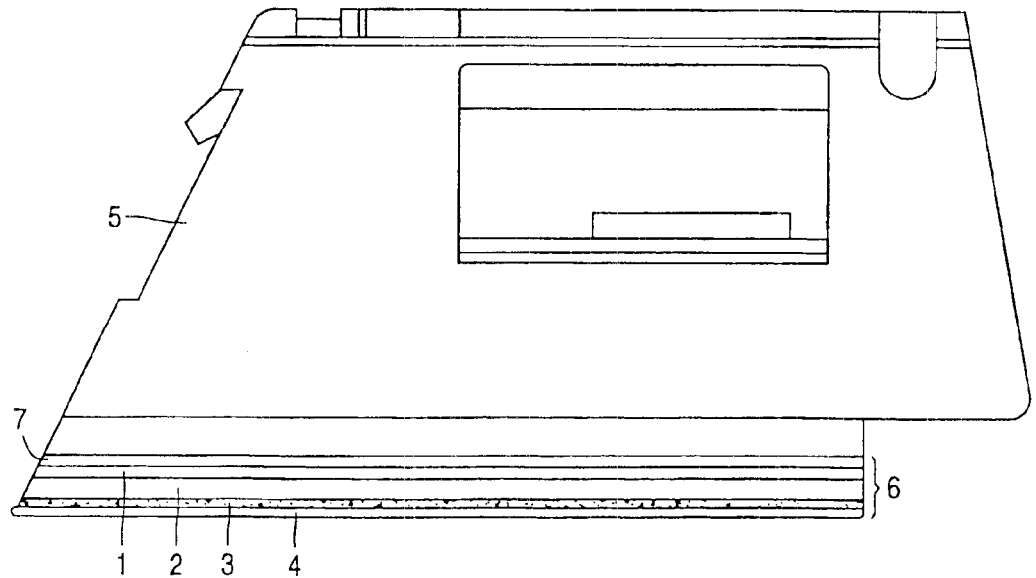

The application comprises a drawing in which:

FIG. 1 schematically shows an enlarged detail of an aluminum substrate that is provided with a sol-gel coating and wherein an intermediate layer according to the present invention is present, said coated aluminum substrate forming part of a domestic appliance; and FIG. 2 schematically shows an iron in accordance with the present invention.

It is noted that the various elements, as shown in FIG. 1 and FIG. 2 respectively, are purely schematic and are not drawn to scale.

FIG. 1 is a schematic cross-section of an aluminum substrate that is provided with a sol-gel coating and wherein an intermediate layer according to the present invention is present, said coated aluminum substrate forming part of a domestic appliance. In this example, the aluminum substrate (1) comprises a thin plate of aluminum. Said aluminum substrate (1) is usually secured to another element of the domestic appliance. The aluminum substrate (1) is provided with a dense layer of aluminum oxide (2). In the example as shown, the thickness of the dense layer (2) is about 10–12 $\mu$m. The surface of the dense layer (2) facing away from the aluminum substrate (1) is provided with a porous layer of aluminum oxide (3). Said porous oxide layer (3) acts as a primer layer in order to provide for a good adhesion of the sol-gel coating (4), which is applied on top of the porous layer (3). The thickness of the porous aluminum oxide layer (3) is about 3–4 $\mu$m. The sol-gel coating (4) has a thickness of about 15 $\mu$m.

FIG. 2 is a schematic side view of an iron according to the present invention. Said iron comprises a housing (5), which can be made of a plastic material. The bottom side of the housing is provided with a metal sole plate (6). In the present embodiment, the sole plate is made of a block (7) of die-castable aluminum to which a thin plate (1) of aluminum is secured. This thin plate (1) is also referred to as the ironing plate. As mentioned earlier, the aluminum plate can comprise aluminum as well as an aluminum alloy.

The surface of the ironing plate (1) facing away from the housing (5) is provided with a multi-layer intermediate structure, comprising a dense layer of aluminum oxide (2) and a porous layer of aluminum oxide (3). Said dense intermediate layer (2) provides for hardness and scratch resistance. Said porous oxide layer (3) acts as a primer layer in order to provide for a good adhesion of the sol-gel coating (5) which is applied on top of the porous layer (4). The thickness of the dense aluminum oxide layer (2) is about 10–12 $\mu$m. The thickness of the porous aluminum oxide layer (3) is about 3–4 $\mu$m. The sol-gel coating (4) has a thickness of about 35 $\mu$m. In this example, the sol-gel coating is built up of two layers, namely a first basic coating of 25 $\mu$m and a top coating of 10 $\mu$m.

In another advantageous embodiment both sides of the ironing plate (3) are provided with a porous layer of aluminum oxide (4) (not shown in FIGS. 1 and 2). The presence of a porous aluminum oxide layer (4) at the side of the ironing plate (3) facing the housing (1) is useful because this side of the ironing plate (3) facing the housing—and thus the steam chamber in case of a steam iron—will be sealed using a silicon paste. As a result of the presence of the porous oxide layer the sealing properties of the silicon paste will be improved.

EXAMPLE 1

An aluminum ironing plate is first degreased in a suitable detergent and subsequently etched in an acidic (like $HNO_3$) or alkaline (NaOH) solution to activate and clean the surface.

After rinsing in tap and deionised water the ironing plate is immersed in an electrolyte solution of 25 v % phosphoric acid. The temperature of the solution is around 30° C. The aluminum ironing plate is connected as the anode and a stainless steel counter electrode is used as the cathode. A current density of 1.5 A/dm$^2$ is applied and maintained throughout the process. After 15 min the current is switched off and the ironing plate is taken out of the solution and rinsed with tap and demineralised water. This process step results in a porous layer of about 3 $\mu$m.

Next the plate is immersed in a second electrolyte solution containing about 60–80 g/l oxalic acid. The temperature is typically 21° C. A current density of 1.7 A/dm$^2$ is applied during a period of 30 min. This will result in an oxide layer of about 10 $\mu$m. After 30 min the current is switched off and the plate is rinsed in tap and demineralised water. Subsequent to this pre-treatment of the ironing plate a sol-gel coating is applied by means of spray coating and cured in an oven at 300° C. for about 15 minutes

EXAMPLE 2

This example shows the improved scratch resistance of sol-gel coatings to aluminum surfaces which are electrochemically provided with a porous layer of aluminum oxide and a dense layer of aluminum oxide, compared to the scratch resistance of sol-gel coatings to aluminum surfaces which are roughened by means of sand blasting and the adhesion of sol-gel coatings to aluminum surfaces which are only provided with a porous layer of aluminum oxide.

Three aluminum plates were prepared. Plate I was prepared by roughening the surface of an aluminum plate by sand blasting and applying a sol-gel coating. Plate II was prepared in a similar way as the ironing plate of example 1, except that the electrochemical treatment with oxalic acid was left out. Plate III was prepared according to example 1.

Forces were applied to aluminum plates I–III and the scratch through of the coating was measured. The results are set out in table 1.

TABLE 1

| | Thickness of intermediate oxide layer ($\mu$m) | Scratch through (kg) |
|---|---|---|
| Plate I | 0 | 2–2.5 |
| Plate II | 3 | 2.5–3.5 |
| Plate III | 3 + 5 | 4–4.5 |
| Plate III | 3 + 11 | 6–7 |

It appears that a significant higher force is needed to scratch through the coating after the sequential anodising step is applied (plate III).

What is claimed is:

1. Domestic appliance, at least comprising an aluminum substrate that is provided with a coating which is provided by means of a sol-gel process and wherein an intermediate layer is present between the aluminum sole plate and the sol-gel coating, wherein the intermediate layer comprises a multi-layer structure comprising a relatively porous layer and a relatively dense layer.

2. Domestic appliance according to claim 1, wherein the relatively porous layer comprises a porous layer of aluminum oxide.

3. Domestic appliance according to claim 1, wherein the relatively dense layer comprises a dense layer of aluminum oxide.

4. Domestic appliance according to claim 2, wherein the porous intermediate layer of aluminum oxide has a thickness of at least 0.5 $\mu$m.

5. Domestic appliance according to claim 3, wherein the dense intermediate layer of aluminum oxide has a thickness of at least 5 $\mu$m.

6. Domestic appliance according to claim 1, wherein said domestic appliance comprises an appliance for the preparation of food and/or beverage.

7. Domestic appliance according to claim 1, wherein said domestic appliance comprises an iron.

8. An iron, comprising an aluminum sole plate which is provided with a coating which is provided by means of a sol-gel process and wherein an intermediate layer is present between the aluminum sole plate and the sol-gel coating, wherein the intermediate layer comprises a multi-layer structure as claimed in claim 1.

9. An iron according to claim 8, wherein the sol-gel coating has a thickness of 20–80 $\mu$m.

10. An iron according to claim 8, wherein the coating has a thickness of 30–40 $\mu$m.

11. An iron according to claim 8, wherein the coating is built up of different subsequent layers.

12. An aluminum iron sole plate provided with a coating which is provided by means of a sol-gel process and wherein an intermediate layer is present between the aluminum sole plate and the sol-gel coating, wherein the intermediate layer comprises a multi-layer structure as claimed in claim 1.

13. A method of manufacturing a domestic appliance, the method comprising the acts of:

providing an aluminum substrate, applying a porous intermediate layer of aluminum oxide by electrochemical treatment of an aluminum sole plate in an electrolyte comprising a solution of phosphoric acid, applying a dense intermediate layer of aluminum oxide by electrochemical treatment in an electrolyte, and providing a sol-gel coating on the treated substrate.

14. A method according to claim 13, wherein the electrolyte that is used to apply a dense intermediate layer of aluminum oxide comprises a solution of oxalic acid or sulphuric acid or a mixture thereof.

15. Domestic appliance, at least comprising an aluminum substrate that is provided with a coating which is provided by means of a sol-gel process and wherein an intermediate layer is present between the aluminum sole plate and the sol-gel coating, wherein the intermediate layer comprises a multi-layer structure comprising a relatively porous layer and a relatively dense layer and further wherein the coating has a thickness of 30–40 $\mu$m.

16. Domestic appliance, at least comprising an aluminum substrate that is provided with a coating which is provided by means of a sol-gel process and wherein an intermediate layer is present between the aluminum sole plate and the sol-gel coating, wherein the intermediate layer comprises a multi-layer structure comprising a relatively porous layer of aluminum oxide and a relatively dense layer of aluminum oxide and wherein the sol-gel coating has a thickness of 30–40 $\mu$m.

* * * * *